(12) United States Patent
Tung

(10) Patent No.: US 6,371,058 B1
(45) Date of Patent: Apr. 16, 2002

(54) METHODS FOR RECYCLING PROCESS WASTEWATER STREAMS

(76) Inventor: Peter Tung, 63 Templer Dr., Ancaster, Ontario (CA), L9G 3X7

( * ) Notice: Subject to any disclaimer, the term of this patent is extended or adjusted under 35 U.S.C. 154(b) by 0 days.

(21) Appl. No.: 09/553,624

(22) Filed: Apr. 20, 2000

(51) Int. Cl.7 .................................. B01D 1/02
(52) U.S. Cl. ................. 122/488; 122/7 R; 159/47.3
(58) Field of Search ................. 122/7 R, 235.29, 122/442, 448, 489, 492; 159/47.3, 901, 905; 203/12, 14, 21, 94, 98; 210/762, 763

(56) References Cited

U.S. PATENT DOCUMENTS

| | | | |
|---|---|---|---|
| 4,230,530 A | 10/1980 | Lemoine et al. | |
| 4,246,233 A | * 1/1981 | Sheeline | 422/159 |
| 4,574,036 A | 3/1986 | Henriot | |
| 4,617,878 A | * 10/1986 | Paquet | 122/7 R |
| 5,156,706 A | 10/1992 | Sephton | |
| 5,205,906 A | 4/1993 | Grutsch et al. | |
| 5,382,321 A | 1/1995 | Fägerlind et al. | |
| 5,445,714 A | 8/1995 | Myers | |
| 5,474,653 A | * 12/1995 | Bostjancic | 159/47.1 |
| 6,092,490 A | 7/2000 | Bairley et al. | |
| 6,155,054 A | 12/2000 | Liebig | |

* cited by examiner

Primary Examiner—Gregory Wilson

(57) ABSTRACT

This invention provides cost-effective alternatives to reduce the cost associated with customary blowdown from steam generating equipment. By selectively recycling process blowdown streams using secondary vaporizers, the net result is a partial replacement of wastewater stream with almost an equivalent quantity of clean steam condensate. The heat transfer is carried out by indirect contact devices, such as shell and tube heat exchanger and the like, without mixing of the two process streams to allow condensate recovery while avoiding cross contamination. This invention carries economic as well as environmental credits. A condensate recovery apparatus can be designed to enable easy connection to existing equipment already in service, as well as easy removal, without causing process disruption.

11 Claims, 3 Drawing Sheets

METHODS FOR RECYCLING PROCESS WASTEWATER STREAMS

BACKGROUND

1. Field of Invention

This invention relates generally to wastewater stream recycling. In a specific respect, the invention relates to improvements in the handling of process blowdown by indirect contact heat exchange methods as secondary evaporators.

2. Discussion of Prior Art

The concept of this invention is applicable to all process blowdown streams, and not limited to only wastewater streams. However, by using steam boiler blowdown as a specific example, the concept of this invention can be more conveniently illustrated.

Besides process equipment dedicated to steam generation such as utility steam boilers, numerous other process applications of vaporizing water to generate steam have long been in practice. Example like waste heat boilers using kettle type reboilers; process coolers using deaerated water or steam condensate to generate steam to control process heat removal; dilution steam generation for use in cracking heaters using heat recovered from cracking heater effluent; and the list goes on. The common element in the above applications is the transfer of heat energy by the use of water/steam as the carrier and latent heat associated with phase change as the mechanism.

When water is evaporated to generate steam, the impurities in the water tend to accumulate in the liquid phase. The level of total dissolved solids (TDS) is generally controlled by blowdown. Too high a TDS level will cause fouling and ultimately lead to equipment failure. In steam generating boilers for example, a typical blowdown rate is around 5% of the water makeup rate. That rate is dependent on feed water quality and treatment chemicals used. For those skilled in the art would be familiar with calculation method using material balance equations. Briefly, a 5% blowdown rate results in a 20-fold increase (or 20 cycle) in concentration of the feed water TDS. That is because the 5% water leaving has to remove 100% of the TDS in the feed stream at steady state condition. At higher blowdown rate, say at 10%, cycle of concentration will drop to 10. Conductivity measurements, reflecting TDS, are commonly used to measure and control TDS levels by adjusting the rate of blowdown. This water outlet stream is often referred to as continuous blowdown. Intermittent blowdown in the "mud drum" is also routinely done so that settled solids can be removed periodically, say, once or twice a 12-hour shift. Anti-fouling boiler treatment chemicals, such as organic phosphates, are often added to keep the TDS in suspension instead of depositing onto boiler tube surfaces. The cost savings in reducing blowdown are used to justify the cost of such chemical addition.

The costs associated with blowdown have long been recognized by the processing industry. A common practice to recover some of the energy in the blowdown stream is by the use of flash drums and economizers. Briefly, when water at saturation temperature at the boiler operating pressure is let down to a lower pressure, say to a flash drum maintained at a lower pressure, a small portion of the water will turn into steam. The flashed steam can be used for lower temperature heating usage. The blowdown water can then be used to preheat incoming makeup water to further recover the heat energy in the effluent water before being sent to wastewater treatment facilities prior to discharge. Consequently, the true cost of blowdown includes the cost of water supply, boiler feed water treatment as well as the post treatment costs before discharge. Water treatment costs aimed at minimizing blowdown rate or higher cycles of concentration in the boiler is being justified accordingly, so says boiler treatment chemical manufacturers. The impact of reducing this blowdown stream, even by a small fraction, is enormous when all steam boilers and process steam generators currently in service are tallied up.

Naturally, it would be economically beneficial to reduce the blowdown rate but not at the expense of higher TDS or increased fouling potential. This invention provides a method of minimizing blowdown without the use and cost associated with additional chemical additives, further helping to improve the environment and shifting the economics towards less overall chemical additives to steam generating systems.

OBJECTS AND ADVANTAGES

Accordingly, several objects and advantages of this invention are: The present invention focuses on opportunities to recycle process condensate so that process blowdown can be minimized. The present invention takes the approach of built-in operability so that the resulting apparatus can be serviced without process interruption. It is another object of this invention to improve the reliability of steam generating devices by allowing a reduction in average cycle of concentration in the evaporator through higher blowdown rates but without the usual costs associated with increased blowdown. It is another object of this invention to provide economic incentives to minimize the use of chemical treatment, its associated costs and impact on the environment. It is yet another object of this invention to reduce the net effluent flow to wastewater treatment facilities, directly impacting on environmental costs. It is yet another object of this invention to reduce the net use of fresh makeup water, also positively impacting on environmental costs.

Further objects and advantages of this invention will become apparent from a consideration of drawings and ensuing description.

SUMMARY

Figure 1:
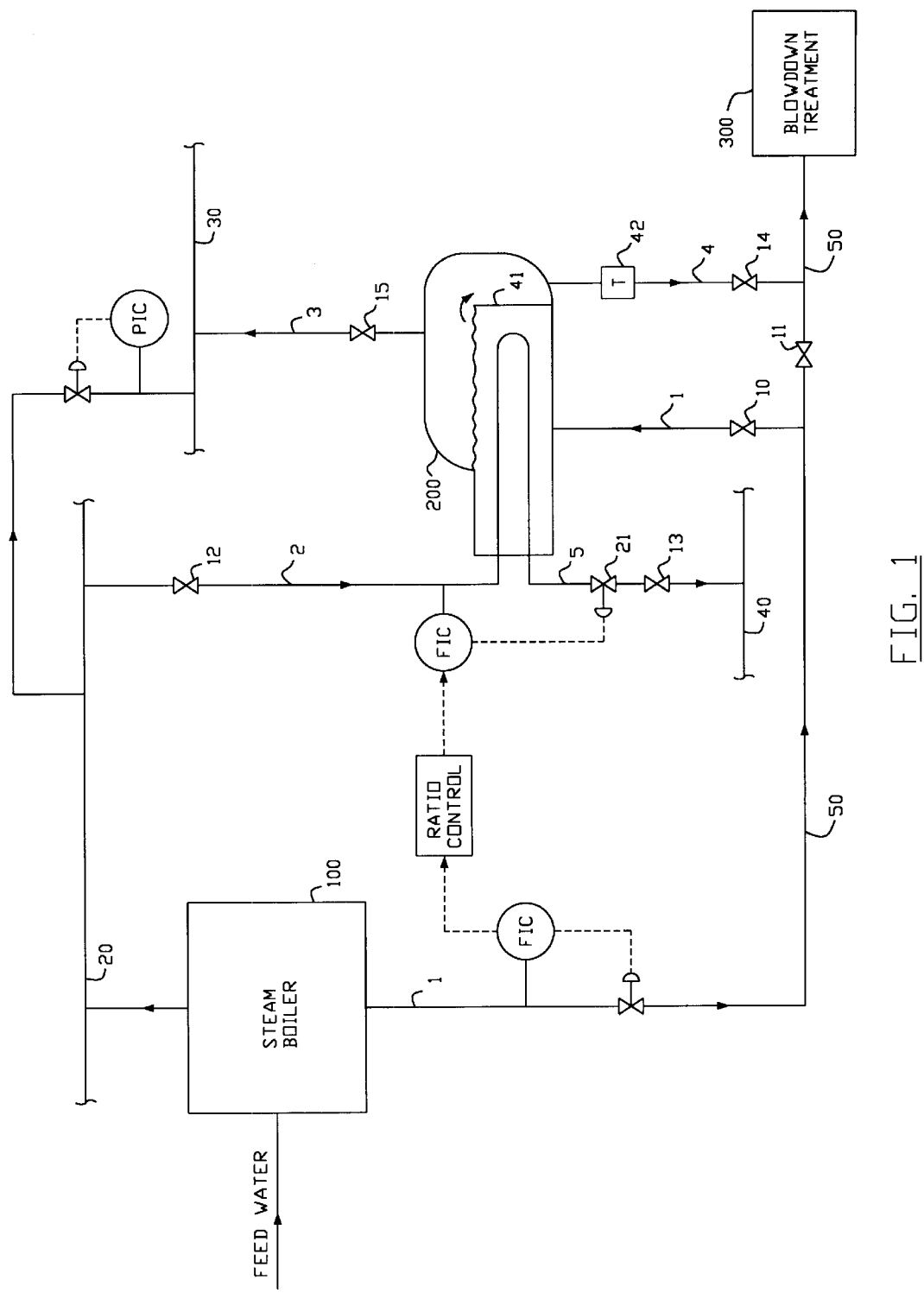
FIG. 1 shows partial vaporization of boiler blowdown using 1500 psig steam.

The summary of this invention is to provide cost-effective alternatives to reduce the cost associated with customary blowdown from steam generating equipment. By selectively recycling process blowdown streams using secondary vaporizers, the net result is a partial replacement of wastewater stream with almost an equivalent quantity of clean steam condensate. The heat transfer is carried out by indirect contact devices, such as shell and tube heat exchanger and the like, without mixing of the two process streams to allow condensate recovery while avoiding cross contamination. This invention carries economic as well as environmental credits. A condensate recovery apparatus can be designed to enable easy connection to existing equipment already in service, as well as easy removal, without causing process disruption.

DESCRIPTION OF THE INVENTION

This invention focuses on the recovery of blowdown streams from a steam generating device, such as a steam boiler or a process steam generator, so that the net blowdown rate can be appreciably reduced. The resulting reduction in net blowdown rate does not compromise the original equipment's performance or reliability, but rather, maintains or reduces TDS level in the primary evaporator unit while allowing chemical treatment costs to be reduced. In order to explain the novelty of this invention better, some background in steam operations are briefly mentioned below.

BACKGROUND

It is customary to refer to an operating plant's steam supply and demand status as the "steam balance". Many pieces of steam related operating equipment make up the system. Each piece of equipment requires a specific quantity and quality of steam supply. For instance, some equipment, such as steam turbine or thermal compressor, extracts useful work from a higher pressure steam by letting down the steam to a lower pressure level. Others are net consumers of steam by condensing steam into steam condensate, extracting the latent heat of condensation. Yet, others are process heat recovery devices, extracting process heat by turning condensate into steam and sending the steam to "steam headers" of appropriate pressure levels. Then there are those steam generators making steam for chemical process use, such as dilution steam for use in chemical reactors. While all the suppliers and consumers are connected into a grid system, usually, the steam boilers act as net producers of high quality superheated steam. Therefore, the steam boilers play an essential role in controlling the overall balance by delivering steam to the highest pressure level header as dictated by process requirement.

The grid system is commonly made up of steam headers operating at different pressure levels, such as those found in oil refinery or petrochemical plant. A common example would be a 5-tier steam system consisting of a 15 psig, a 125 psig, a 250 psig, a 600 psig and a 1500 psig headers. Special attention is often needed to balance the steam load requirement at all operating conditions in order to avoid unnecessary letdown. Unnecessary letdown leads to surplus in less useful steam, which could result in venting steam to the atmosphere. From a process point of view, some steam is more useful than others. In thermodynamics, the concept is often referred to as entropy. Very briefly as a simplified interpretation, heat can only flow from higher temperature to a lower temperature. This reality also indirectly discourages letting down of steam from a higher pressure (higher condensing temperature) to a lower pressure (lower condensing temperature) simply because the process is not reversible.

At other times, however, it may be necessary to letdown steam just to keep the supply and demand in balance. When such opportunity exists as the norm, then the operating scenario favors the reduction of net boiler blowdown rate. Let us take the above 5-tier steam system as an example:

the steam boiler(s) generating steam at 1500 psig level, continuous blowdown rate of 5% of total steam load and at least 2% of 1500 psig steam is letdown to the 600 psig header as a norm.

PRESENT INVENTION

As a convention throughout this specification, the main boilers are termed the primary evaporators while the secondary evaporators are the units described by this invention to handle blowdown from the primary evaporators.

By following the principle of pressure conservation, the most beneficial location to install a blowdown reduction device, or Recovering Condensate Device RCD, will be at the highest pressure level possible. Accordingly, the continuous blowdown stream 1 from steam boiler 100 is diverted from header 50 by valving arrangement 10 and 11 to enter a kettle type evaporative exchanger 200 as shown in FIG. 1. Steam flow 2 from 1500 psig steam header 20 is connected to the RCD via tie-in valve 12 and controlled by flow control valve 21 which controls the fraction of the continuous blowdown to be recovered. Condensed steam 5 from the tube bundle is routed via control valve 21 and returned to condensate header 40 via tie-in valve 13. The resulting steam 3 produced in the secondary evaporator 200 is directed to the next highest pressure level which happens to be the 600 psig header 30 via tie-in valve 15. The pressure in the secondary evaporator 200 floats with 600 psig header pressure. The level in the secondary vaporizer 200 is controlled by an overflow weir 41. The overflowed liquid is the concentrated blowdown water 4 being discharged out of the evaporator 200 via liquid outlet trap 42 and tie-in valve 14 back towards blowdown treatment facility 300 via header 50. Liquid outlet trap 42 can be a typical reverse bucket trap, a condensate pump or the like. Naturally, the RCD operates at a higher cycle of concentration compared to the primary evaporators, depending on the fraction evaporated. The fraction vaporized can be controlled by proportioning 1500 psig steam flow 2 to blowdown stream 1 from primary steam generator using a ratio controller. The level controlling weir 41 will then let out the balance of the feed liquid as secondary blowdown 4. For instance, the cycle of concentration will be doubled if half of the blowdown from the primary evaporator is recycled as 600 psig steam as outlined in FIG. 1. Typically, one-third reduction of net blowdown, thereby increasing cycle of concentration by 50%, would not pose many operating problems. At higher recovery rates however, fouling in the RCD unit over time is expected. Consequently, a dual evaporator setup may be necessary to allow for periodic cleaning because of the high TDS level. Since this recovery operation is not part of the main circulation loop, trading off capital costs against operating savings can be determined on a site by site basis. Multiple RCD units may be more economical on one extreme, while a single RCD with no allowance for backup service during cleaning on the other extreme. The decision depends on the blowdown arrangement and economics. Online/offline cycle can also be driven by the steam balance situation. FIG. 1 shows tie-in arrangements that can allow easy isolation and off line cleaning of the RCD unit.

The above is definitely not obvious and may seem redundant according to conventional wisdom. Why would anyone want to use steam to generate steam?

The surprising benefit lies in the resulting 1500 psig steam condensate, as shown in the example in FIG. 1 which can be recovered as clean condensate and reused without much processing steps and costs. For example, it can be pumped directly to primary boiler as feed water. The portion of blowdown that would otherwise be headed for the wastewater treatment facility can now be recovered as 600 psig steam. The net effect is a swapping of wastewater treatment flow in exchange for the clean 1500 psig steam condensate. The former carries a debit while the later is clean and readily usable. The operating cost to achieve the swapping is the same as letting down the same quantity of 1500 psig steam to the 600 psig steam header, with no net gain or loss in heating value.

This secondary evaporator application can also be placed at various pressure levels. The only criteria are the availability of heat source and utility of the recovered steam from the process. One variation of the above recovery method is to use the same primary heat source in the secondary recovery process. This would avoid the pressure down grading penalty as described above. The following is a specific example.

Figure 2:
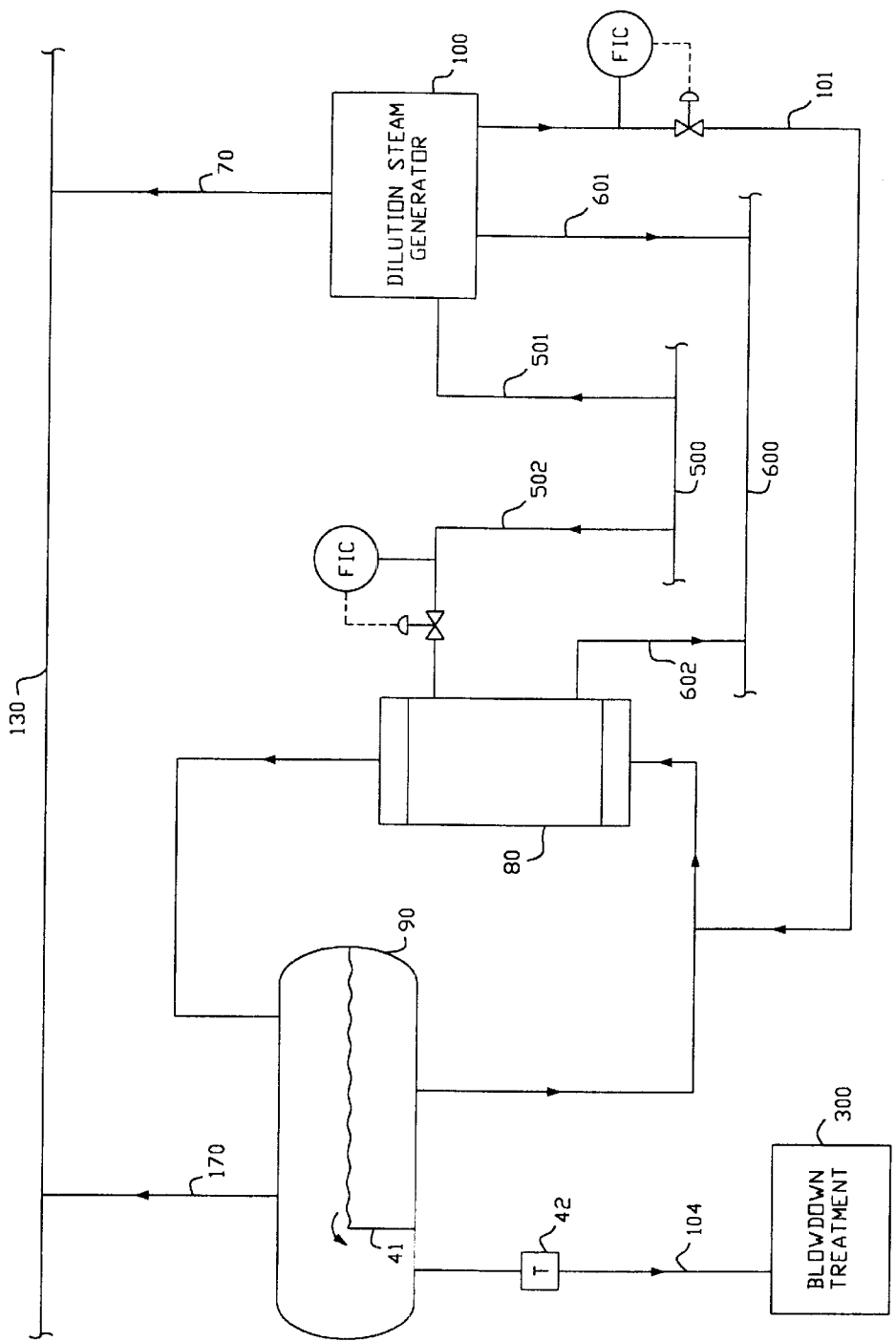
FIG. 2 shows the invention applied in a dilution steam generation process.

FIG. 2 shows the invention adapted for dilution steam generation where dilution steam 170 is produced by hot quench oil flow 502 through a thermal siphon reboiler 80 in combination with a disengaging drum 90. Briefly, dilution steam is required in many chemical reaction processes where the reactant concentration needs to be diluted in order to improve chemical reaction selectivity. Steam, besides other desirable effects, acts as an inert vapor in lowering the partial pressure of the reactants in the reactor. Due to the usual high volume usage, a once through system of boiler steam to wastewater treatment is often cost prohibitive. Dilution steam system is therefore usually a recycling process, using process heat to regenerate the steam for process use. Regardless of the vaporization process, fouling concerns are universal. Consequently, dilution steam generators also have to abide by the same TDS limits. The TDS input comes from direct contact with hydrocarbon streams. More specifically, the dilution steam comes in direct contact with the inorganic components in the hydrocarbon streams. Downtime carries a very substantial penalty for continuous processes like this one. Because of the generally poorer water quality, blowdown rates are often even more conservative when compared with the dedicated steam boilers. As can be seen from the above, the dilution steam production system is designed to reuse process water as much as economically feasible. A thermal siphon type reboiler in combination with a disengaging drum offers a higher degree of fouling tolerance because of higher fluid velocity achievable in the reboiler heating transfer surface.

As an illustration of the adaptability of this invention, a small thermal siphon type reboiler is shown in FIG. 2. In this application, the process heat source for the secondary evaporator is from the same source as the primary evaporator. The primary dilution steam generator 100 is powered by quench oil flow 501 in and quench oil flow 601 out from supply header 500 and return header 600 respectively. Quench oil flow 502 is diverted from the same quench oil supply header 500 and returned 602 to the same quench oil return header 600 to provide heat to the secondary evaporator 80 where additional quantities of dilution steam 170 is produced. In disengaging drum 90, the two-phase mixture of water and steam is allowed to separate. Generated dilution steam 170 is directed to the dilution steam header 130. The blowdown stream 104 from this secondary evaporator contains higher concentration of TDS. It is directed to blowdown treatment facility 300. Total steam load as specified by process demand requirement remains unchanged. The secondary load contribution is effectively reducing the primary load by the same amount. The feed water 101 to this secondary evaporator comes from the blowdown of the primary evaporator. The reduction in net blowdown is balanced by a similar drop in boiler feed water makeup flow to the primary evaporator dilution steam generator.

As an alternative, steam can be supplied as heat source to the secondary evaporator. This way, no quench oil tie-ins will be needed.

In processes where the primary blowdown rate is marginally sufficient to prevent fouling, the above example can now offer another wonderful aspect of this invention with rather unexpected results as follows. Because of this drawing away of TDS content by the above arrangement, a higher mean blowdown rate at the primary evaporator can be achieved without the usual penalty associated with higher blowdown rate. In turn, that could be translated to lower chemical treatment cost for the main evaporator, cleaner tubes and less maintenance cost and down time. In essence, this invention now opens yet another dimension to optimizing chemical treatment costs and other savings mentioned earlier. This secondary evaporator arrangement is truly offering surprising results, functioning like subcontracting out TDS treatment facility from the primary evaporators.

The RCD arrangements as shown in FIG. 1 and FIG. 2 can be easily arranged in a skid mounted assembly fashion, ready for easy hookup or isolation from any primary evaporator. All that is required is connections for supply steam, condensate return, primary blowdown inlet, secondary blowdown outlet and recycled steam outlet, i.e. all the required utility connections.

Figure 3:
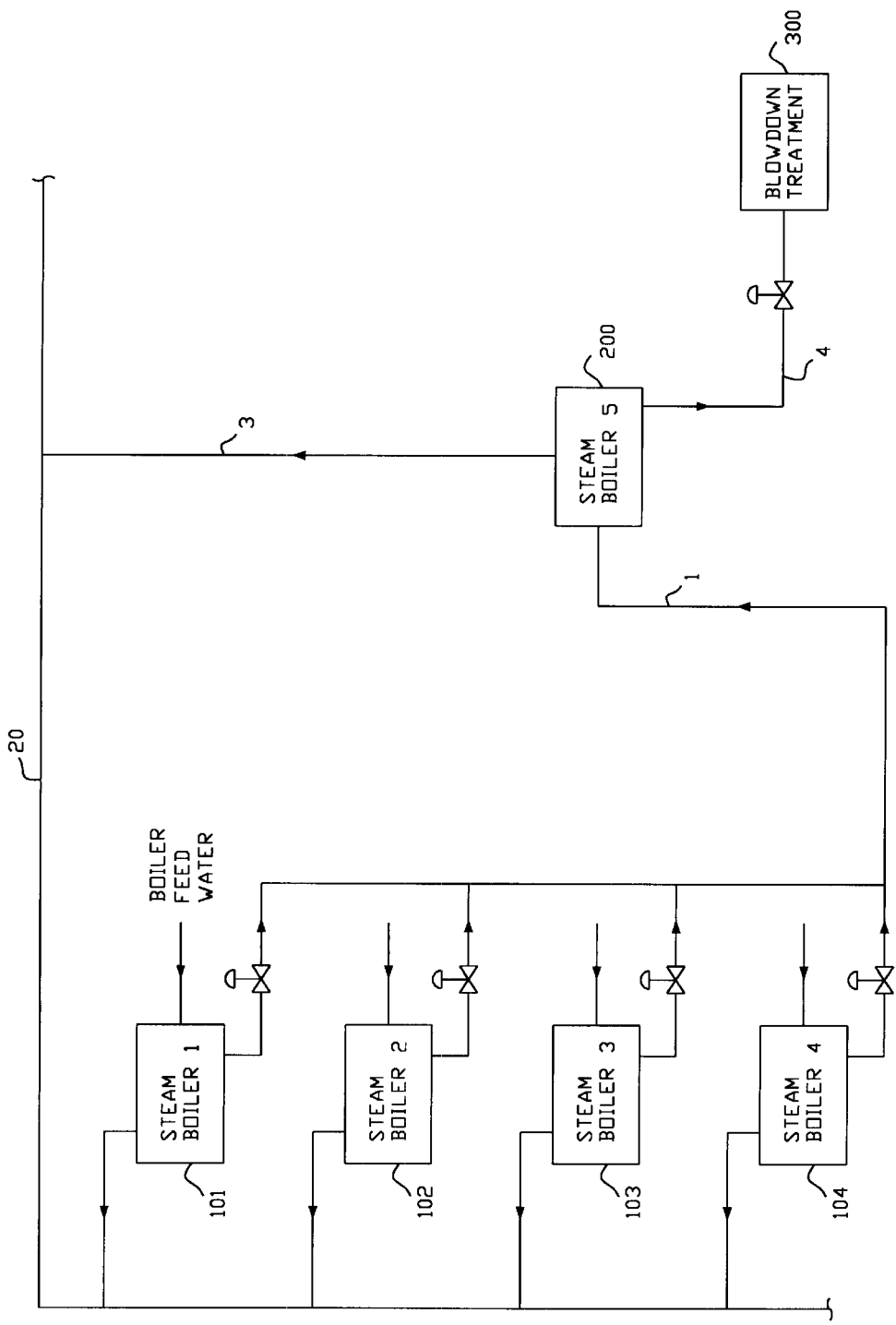
FIG. 3 shows schematic diagram of multiple boilers arrangement to reduce net blowdown.

As can be seen, this invention involves secondary evaporator(s), which can be readily isolated and taken offline to be cleaned without affecting operation of the primary evaporator(s). In some applications, the secondary evaporator can be identical to the primary ones in size and operation. FIG. 3 shows schematically an example of such an application of this invention. In a multiple steam boiler arrangement 101, 102, 103, 104, the combined blowdown streams 1 from parallel primary evaporators can be fed to one or more secondary evaporators 200 to concentrate blowdown 4 and generate steam 3 to be directed to common steam header 20. This way, phosphate treatment could be reduced or eliminated in the primary evaporators.

Other variations are possible for those skilled in the art, without deviating from the spirit and concept of the present invention. For example, another variation would be to maintain the same net blowdown rate from the secondary evaporator as before the installation of the secondary evaporator. The result would be drastic reduction of the cycle of concentration in the primary evaporator. Such arrangement trades off savings in net blowdown with a maintenance free secondary evaporator while providing luxuriously clean condition for primary evaporators.

Additional Ramifications

The concept of this invention can also be applied to processes currently using direct steam injection as stripping media or heating media or both. This invention can be applied to recover clean condensate, in relatively smaller quantities, from process wastewater streams by designing the secondary evaporator to avoid fouling as required. Example would be to design the evaporator to operate at higher tube surface velocity, such as thermal siphon reboiler type heat exchangers in FIG. 2. This design can tolerate higher total dissolved solids. Unlike the example given in dilution steam generation earlier in this specification where the main emphasis is to recycle a majority of the process water using the minimum required blowdown rates, small fraction of a process blowdown stream can be recycled using this method to partially subsidize the direct steam injection requirement or have it replaced all together, depending on the circumstances.

Conclusion, Ramifications, and Scope of Invention

Thus, the reader will see that this invention is truly one practical solution of extending the use of resources like fresh water supply, treatment chemicals and wastewater treatment resources as well as reducing municipal sewer surcharges. While the above description contain many specificities, these should not be construed as limitations on the scope of the invention, but rather as exemplification on preferred embodiments thereof. Many other variations are possible. Examples can be found in pulp and paper industry applications, pharmaceutical manufacturing processes, food and beverage industry applications, coal tar distillation and the list goes on.

What is claimed as the invention is:

1. An apparatus for use as a secondary evaporator comprising of:
   at least one indirect contact heat exchange device,
   means for introducing at least one liquid stream to said device for partial vaporization of said liquid stream,
   means for introducing at least one heat supply source for said partial vaporization,
   means for discharging non-vaporized portion of the liquid stream out of the device,
   means for discharging the vaporized portion of the liquid stream out of the device, and,
   means for controlling extent of the partial evaporation in said apparatus thereof,
to maintain a desirable level of total dissolved solids concentration in the apparatus.

2. The apparatus according to claim 1 where said liquid stream for partial vaporization in claim 1 is a continuous blowdown stream from a steam boiler type primary evaporator, said heat supply in claim 1 for the partial vaporization is steam produced by said primary evaporator, said non-vaporized portion of the liquid stream in claim 1 is discharged as needed to maintain liquid inventory in the secondary evaporator by level control means, said vaporized portion of the liquid stream in claim 1 is discharged to a steam header operating at a lower pressure than the heat supply steam pressure in claim 1.

3. The apparatus according to claim 2 where the heat supply for vaporization is ratio controlled to said continuous blowdown stream from said steam boiler type primary evaporator.

4. The apparatus according to claim 2 where said level control means is by an overflow weir in combination with a liquid discharge device, such as a steam trap, at the overflow side of said overflow weir.

5. The apparatus according to claim 1 where said indirect contact heat exchange device comprised of a thermal siphon reboiler in combination with a disengaging drum.

6. The apparatus according to claim 1 where said indirect contact heat exchange device is a kettle type reboiler.

7. The apparatus according to claim 1 where said liquid stream for partial vaporization is a continuous blowdown stream from a dilution steam generator type primary evaporator, said non-vaporized portion of the liquid stream in claim 1 is discharged as a continuous blowdown stream, said vaporized portion of the liquid stream in claim 1 is discharged to a dilution steam header.

8. The apparatus according to claim 7 where the heat supply for vaporization is provided by quench oil flow, said quench oil flow is automatically adjusted to maintain a preset ratio of partial evaporation of said continuous blowdown stream from the dilution steam generator type primary evaporator by using a flow ratio controller.

9. The apparatus according to claim 7 where the heat supply for vaporization is provided by steam flow, said steam flow is automatically adjusted to maintain a preset ratio of partial evaporation of said continuous blowdown stream from the dilution steam generator type primary evaporator by using a flow ratio controller.

10. The apparatus according to claim 1 where said liquid stream for partial vaporization comprised of continuous blowdown streams from at least one steam boiler type primary evaporator, said heat supply in claim 1 for the partial vaporization is provided by an external heat source, said non-vaporized portion of the liquid stream in claim 1 is discharged as a continuous blowdown stream, said vaporized portion of the liquid stream in claim 1 is discharged to a suitable steam header.

11. The apparatus according to claim 10 contains all the features of said steam boiler type primary evaporator.

* * * * *